May 28, 1940.  J. D. DODGE  2,202,649
HOMOGENIZING HEAD
Filed Aug. 5, 1938  2 Sheets-Sheet 1
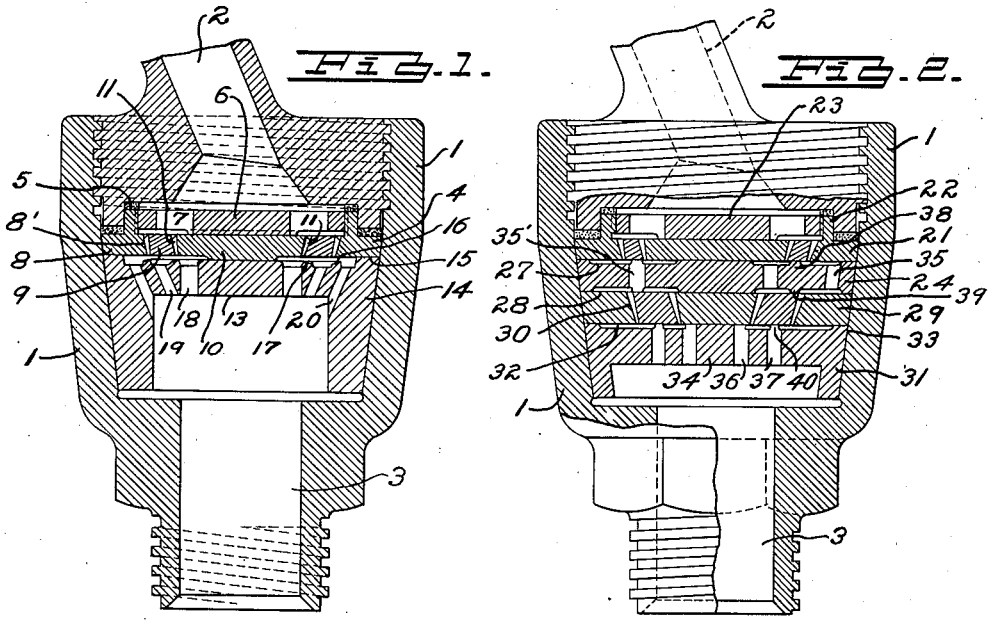
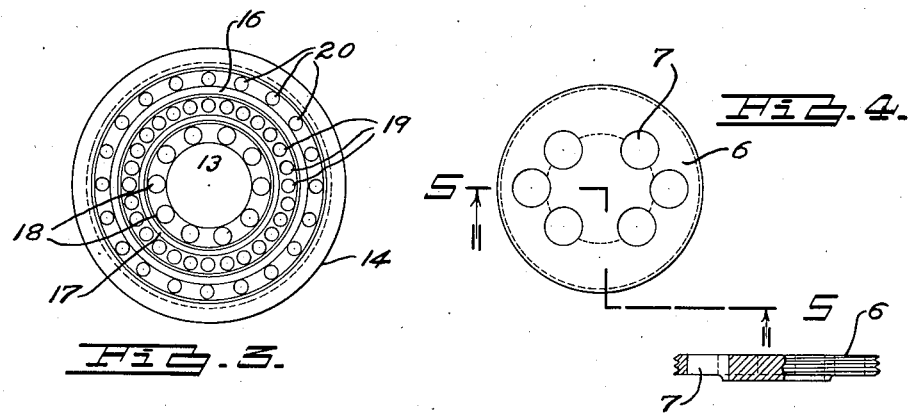
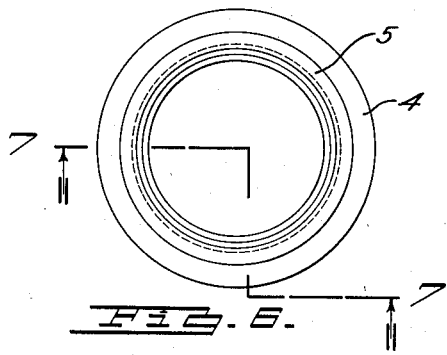
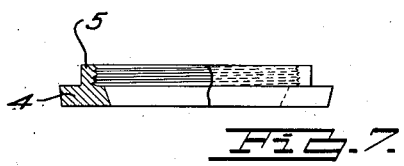
INVENTOR.
John Duval Dodge
BY
ATTORNEY.

May 28, 1940.  J. D. DODGE  2,202,649
HOMOGENIZING HEAD
Filed Aug. 5, 1938  2 Sheets-Sheet 2
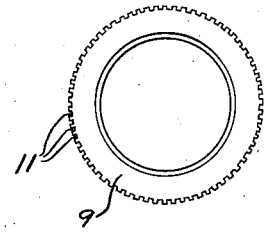
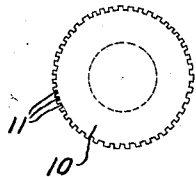
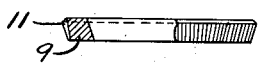
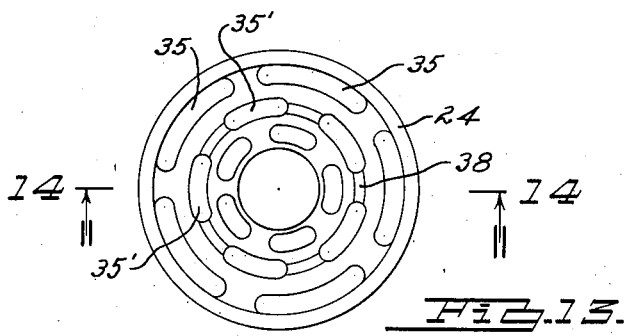
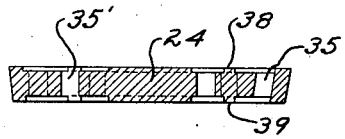
INVENTOR.
John Duval Dodge
BY
ATTORNEY.

Patented May 28, 1940

2,202,649

UNITED STATES PATENT OFFICE 2,202,649

HOMOGENIZING HEAD

John Duval Dodge, Detroit, Mich., assignor to Dodge Emulsor Corporation, Detroit, Mich., a corporation of Michigan Application August 5, 1938, Serial No. 223,186

4 Claims. (Cl. 99—265)

This invention relates to homogenizing or emulsifying devices, the object being to provide a new and improved form of homogenizer in which there is a composite plate or a series of composite plates within a hollow body formed of a number of concentric parts, in which the periphery of one or more of the inner parts is formed with transverse grooves in the face thereof, the inner part or parts of the composite plates being preferably of coned form and the grooves providing passageways for liquid through the plate. The composite plates, if more than one is used, are preferably spaced by a plate having larger apertures therethrough than is provided by the grooves in the composite plates and as hereinafter described, the device may be constructed to provide a single or a multi-stage homogenizer.

A feature of the invention resides in the provision of a single or multi-stage homogenizer constructed and arranged to cause the liquid being passed therethrough under pressure to be compressed and bombarded, as by striking a plate surface, expanded and in the multi-stage device passing the same through a second or a series of composite plates formed with the peripheral transverse grooves.

In either of the forms of my improved homogenizer, the grooves of the composite plates are formed to provide passageways of less cross sectional area on the discharge side of the plate than on the entrance side and in any of the forms of homogenizer, the discharging liquid strikes a surface of the next plate which is spaced from the composite plate and providing an area therebetween in which the liquid may expand after ejection and the striking of the surfaces of the next plate.

These and other various objects and features of the invention are hereinafter more fully described and claimed, and the preferred form of a homogenizing device embodying my invention is shown in the accompanying drawings in which—

Fig. 1 is a cross sectional view of a single stage homogenizer embodying my invention.

Fig. 2 is a similar cross sectional view of a two-stage homogenizer.

Fig. 3 is a plan view of an apertured base or supporting member for the series of plates.

Fig. 4 is a plan view of an apertured header plate.

Fig. 5 is an edge elevation thereof.

Fig. 6 is a plan view of the outer portion of a composite plate.

Fig. 7 is a cross section thereof.

Fig. 8 is a plan view of the ring member of the second element of the composite plate.

Fig. 9 is a sectional view thereof.

Fig. 10 is a plan view of the central member of the composite plate.

Fig. 11 is a sectional view thereof.

Fig. 12 is an enlarged sectional view showing the form of the grooves or slots provided in parts of the composite plate.

Fig. 13 is a plan view of an apertured plate used in a multi-stage homogenizer.

Fig. 14 is a sectional view thereof.

The invention herein disclosed is involved generally in either of the forms shown in the drawings, the two forms differing merely in the number of composite plates having the grooves through which the milk is passed under high pressure and velocity to strike against surfaces of a succeeding plate or element.

The device in its simplest form is shown in Fig. 1 in which 1 is the body of the device having an inlet 2 and an outlet 3. The inlet 2 is threaded in the end of the body which is of cylindrical form at its inlet end and applies pressure to the composite plate 4 which is formed with a circular upstanding flange 5 interiorly threaded to receive the threaded apertured plate 6. The plate 6 has a series of apertures 7 therein as is indicated in Fig. 4 through which the liquid under treatment may freely pass. The composite plate 4 is formed of an outer ring-like member 8 having a flange 5 as before stated and an inner coned surface 8', a ring-like member 9 having an inner coned surface and a central member 10. The peripheries of the central member 9 and of the ring member 8 are of coned form and provided with transverse grooves 11 which are of greatest cross sectional area at the entrance side of the plate and of less cross sectional area at the discharge side and thus provide what is hereinafter termed "tapered" grooves or passageways. These grooves may be of any desired form in cross section as, for instance as illustrated in Fig. 12, either of a rectangular form 11 or V form 12.

It will be noted that the discharge side of the plate 6 is of greatest thickness at the center and less thickness thereabout and thus when the plate 6 is tightly threaded in the flange 5 of the member 8 of the composite plate, the several parts of the composite plate are held in pressure engagement one with the other by the plate 6 and it is further to be noted, that the central element 10 of the composite plate is of greater thickness than the remainder of the plate. This portion 10 engages the central portion 13 of the supporting element 14. The plate 14 has a peripheral flange 15 on which the member 8 of the composite plate rests. The supporting plate 14 is formed with a series of circular grooves about the central portion 13 forming lands 16 and 17 between the grooves and apertures 18, 19 and 20 are formed in the bottoms of these grooves. The parts are assembled as indicated in Fig. 1 and the discharge ends of the passageways or grooves formed between the parts of the composite plate direct the liquid under treatment to the surface of the lands whereby a bombardment of the particles of liquid under treatment takes place and as both the lands and the grooves are in spaced relation with the composite plate, an area between the plates is provided of greater cross sectional area than that of the grooves and the liquid then passes through the apertures 18, 19 and 20 in the supporting element 14.

In the structure so far described, the liquid under treatment is only placed under compression with high velocity once in its passage from the inlet to the outlet and provides what I have termed a "single state" homogenizer. It is the forcing of the liquid through apertures in which the pressure is high and a high velocity attained that causes compression, bombardment and expansion of the particles of the liquid under treatment as, for instance, the fat globules in milk. The elements 4 and 14 have a curved outer periphery to fit the inner coned surface of the body 1.

In the two-stage form of homogenizer shown in cross section in Fig. 2, the top composite plate 21 is of the same character of construction as the composite plate 4 of Fig. 1 and has a flange 22 threaded to receive the threaded periphery of a plate 23 corresponding to the plate 6 of Fig. 1. A separator plate 24 having a circular groove 27 is formed in its upper face and a similar groove in its lower face. The rim and the central portion of the plate 24 are of greater thickness than the body of the plate therebetween and they rest upon the composite plate 29 which is similar to the plate 21 in that it is provided with several concentric parts having the transverse tapered grooves 30 therebetween.

The plate 24 has an upstanding ring-like element 38 on its upper surface which engages beneath the second ring element of the composite plate 21 and has a similar ring 39 on its under surface which engages the upper face of the second ring-like element of the composite plate 29.

The supporting element 31 has a ring-like portion 40 on its upper surface supporting the under side of the second ring-like element of the composite plate 29. Thus all the parts of the plates are held in a pressure contact. The apertures 35' in the separator plate 24 open through the ring members 38 and 39 and thus liquid from the two passageways in the plate 21 which enters the space 27 may flow to the aperture 35'. This arrangement is also true of the apertures 36 in the element 31. The upper surface of the supporting member 31 has an outer flange 33 and a central raised portion 34 which are contacted respectively by the outer flange element of the plate 29 and the central element of the said plate thus providing a space between the plate 29 and the member 31.

The grooves in the plate 21 are so positioned that milk or liquid under treatment injected therethrough strikes the surface of the plate 24 and may expand in the space between the plate 24 and the composite plate 21. The plate 24 is formed with apertures 35 through which liquid may freely pass into the space 28 between the plates 24 and 29 and thence through the tapered passageways of the plate 29 and into the space 32 between the plate 29 and supporting element 31 and thence through apertures 36 and 37 provided in the member 31 to the outlet. In the two-stage arrangement, the milk described or other liquid under pressure passes through the tapered grooves of the first composite plate 21, is then bombarded and expands and passes through the said plate and thence through the tapered passageways in the plate 29 and then is bombarded and permitted to expand and pass freely through the apertures 36, 37 to the outlet.

It will be evident from the foregoing description, that the number of composite plates may be varied to secure a varied fineness of comminution of the particles of liquid under treatment and depending somewhat upon the character of liquid to be treated. With the arrangement of parts and particularly due to the tapered groove structure of the composite plates, a finer comminution of particles of the liquid is obtained at less head pressure than has been provided in prior art structures known to me in which apertures of uniform cross sectional area are provided. Further, the device, due to its having the conical inner surface of the body and the first composite plate being a pressure applying plate, the conical faces of the several plates of the series are seated firmly in the body and the parts of the composite plates are held from displacement by reason of variations in pressure of the liquid or other cause.

Having thus fully described my invention, its utility and mode of operation, what I claim and desire to secure by Letters Patent of the United States is:

1. In a homogenizing device, a body having a threaded inlet and a discharge end, a series of plates therein seating within the body, means for applying pressure to a second plate of the series comprising an inlet element in threaded engagement with the inlet end of the body, and engaging said second plate, said second plate having a flange spaced from the periphery and extending toward the inlet, said flange being internally threaded, an aperture plate in threaded relation therewith and through which liquid first enters the series of plates, said second plate being a composite plate formed of a central and two successive concentric elements, the contacting surfaces of the central portion and of the successive concentric portions being of cone form, and the central portion and next succeeding portion having the respective peripheries provided with transverse grooves, said central portion of the composite plate being in pressure contact with a central portion of the apertured plate whereby the threading of the apertured plate in the flange of the second plate applies pressure to the central portion of the second plate, a third plate of the series having a periphery in pressure contact with the discharge side of the second plate, and a central portion in contact with the central portion of the composite plate, said third named plate having apertures therethrough opening to the outlet of the body and being out of alignment with the passageways formed between the parts of the composite plate.

2. In a homogenizing device, a hollow body having an inlet and an outlet and an inner coned surface, a series of plates each having a coned periphery seating against the coned surface of the body, means for holding the plates in pressure engagement one with the other and with the coned surface of the body, said plates comprising an apertured member on the pressure side of the series of plates, a composite plate forming the second of the series, said composite plate being formed of several concentric parts having at least two of the parts provided with contacting surfaces of cone form, one of the contacting surfaces having tapered grooves providing liquid passageways therebetween, the first plate having the portion thereof provided with openings spaced from the surface of the composite plate and the apertures between the parts of the composite plate opening to the said space, a third plate of the series comprising a cone-like member having apertures therethrough, said third plate being so positioned that the apertures therein are misaligned with the passageways of the second plate whereby the discharging liquid strikes a surface of the last named plate, the said surface being spaced from the discharge side of the second plate.

3. In a homogenizing device, a hollow body having a threaded inlet member, an outlet, and an inner coned surface toward the discharge end, the inlet end thereof being internally threaded, a conduit like member for threaded relation therewith, and a series of plates each having a coned periphery for seating against the coned surface of the body, the said threaded inlet member providing a means for applying pressure to a plate of the series, said plates comprising at least two composite plates having passageways for liquid therethrough, and a separator plate having apertures out of alignment with the passageways, the several plates having projections separating the plates thereby providing spaces therebetween of greater area than a cross sectional area of the passageway, the apertures in said separator plate being out of alignment with the liquid passageways in the composite plates.

4. In a homogenizing device, a body, a series of plates seated in the body, the plates having projecting portions on one side to support the same in spaced relation with the next succeeding plate of the series, an intermediate plate of the series being a composite plate formed of concentric members having coned surfaces in contact one with the other, there being grooves provided in the coned surface of the central portions of the composite plate providing tapered passageways therethrough for passage of liquid, the passageways being of greatest cross sectional area on the entrance side of the composite plate, the plates on the opposite sides of the intermediate plate having apertures for the free passage of liquid to and from the intermediate plate.

JOHN DUVAL DODGE.